(No Model.)
V. HALTER.
MANUFACTURE OF AXES.
No. 323,671. Patented Aug. 4, 1885.
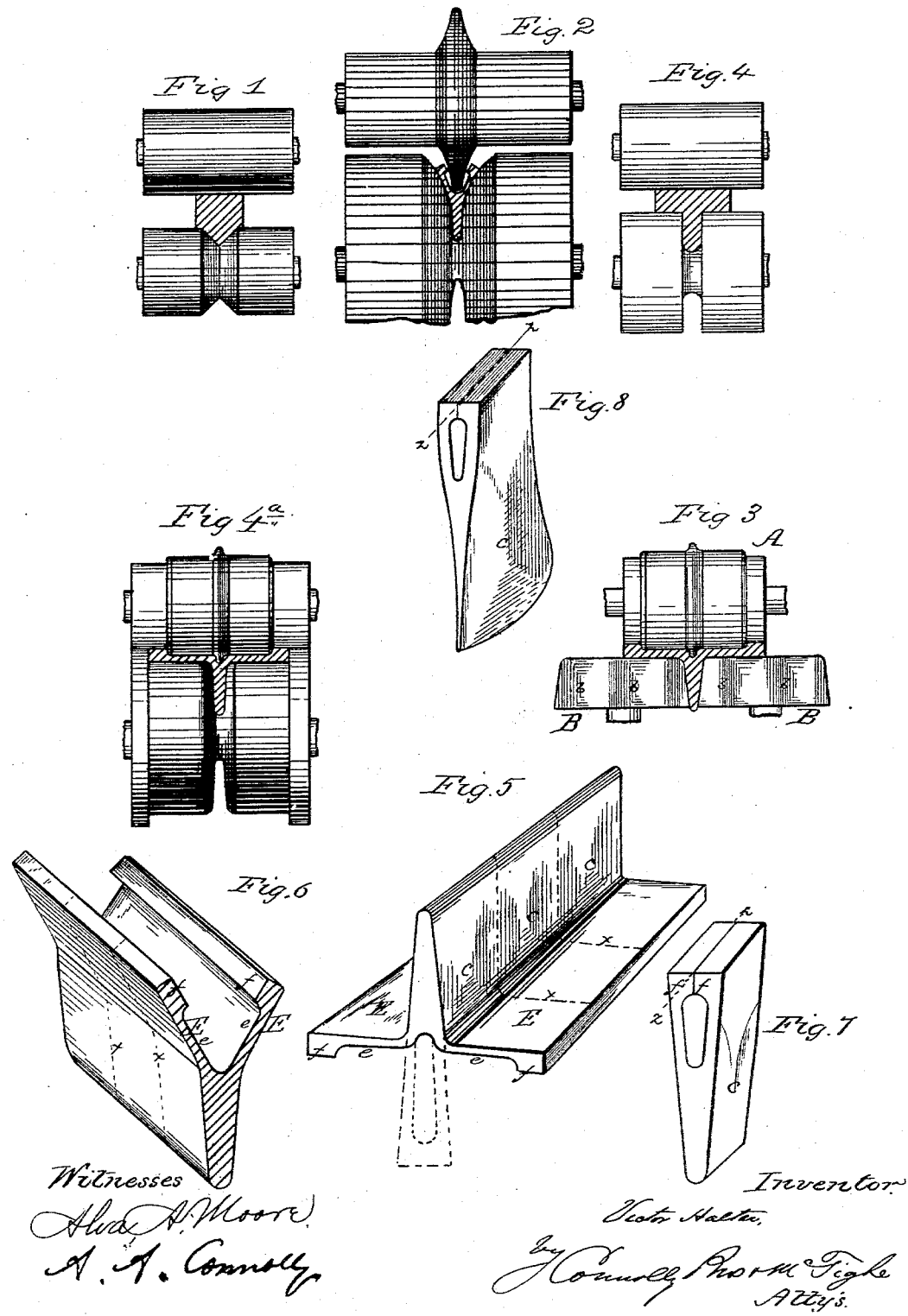

UNITED STATES PATENT OFFICE.

VICTOR HALTER, OF PITTSBURG, PENNSYLVANIA, ASSIGNOR OF ONE-HALF TO FRANK SCHNEIDERLOCHNER, OF SAME PLACE.

MANUFACTURE OF AXES.

SPECIFICATION forming part of Letters Patent No. 323,671, dated August 4, 1885.

Application filed June 8, 1885. (No model.)

*To all whom it may concern:*

Be it known that I, VICTOR HALTER, of Pittsburg, in the county of Allegheny and State of Pennsylvania, have invented certain new and useful Improvements in the Manufacture of Axes; and I do hereby declare that the following is a full, clear, and exact description of the invention, which will enable others skilled in the art to which it appertains to make and use the same, reference being had to the accompanying drawings, which form a part of this specification.

This invention has relation to the manufacture of solid steel axes; and it consists in a novel process or method whereby a blank is rolled from an ingot of steel, the blank bar severed transversely in suitable ax-lengths, and the axes finished from the severed lengths by welding the bifurcated butt, and spreading and grinding the cutting-edge, all as hereinafter described and claimed.

In the manufacture of axes it has been customary to produce the same from bar-iron, the bar or billet being heated, cut off in requisite lengths, the latter punched to form the eye, after which it is reheated, pressed or forged, split to receive the steel bit, said bit inserted and welded, and the ax finally subjected to the finishing operations, the nature of which are well understood.

In manufacturing axes by the customary processes there are many disadvantages to be contended with incident to the various steps involved, and the necessity of reheating the blank frequently and subjecting it to many alternating processes. It is also found that in welding the steel bit to the iron the steel is injured and the quality of the ax much impaired.

I have found that a practically perfect ax may be made of solid steel by a process of rolling a blank from an ingot, and that by said process and the steps incident thereto the defects of the ordinary ax are entirely obviated.

In carrying my invention into effect I subject an ingot of tool-steel to a number of passes between rolls of different shape until it is reduced to a bar of approximately Y shape in cross-section. I then sever this bar into requisite ax-lengths, and afterward bring together and weld the two sections constituting the head, leaving between the head and the cutting-blade an eye for the reception of the handle. The ax is then in a condition for spreading and grinding.

As will be seen, the entire operation consists of rolling until the blank bar is ready for cutting, and it is not necessary to resort to forging, die-pressing, clipping, or other operations required in producing axes from iron.

The process of rolling is particularly adapted for the manufacture of steel axes, as steel being practically without grain cannot be injured by rolling, but will still remain in perfect condition for the uses to which it is to be applied. In the production of an ax of rolled steel I avoid the impairment of the cutting part, which follows the high heating required in welding a steel bit to an iron body; hence I produce an ax of better cutting quality and of greater durability than the iron ax having a steel bit or edge.

The manufacture of axes according to my process involves much less labor and expense than the usual processes, and hence the cost of the solid steel ax will compare favorably with that of the iron ax, while being a much superior tool.

In the accompanying drawings, which illustrate the principal steps in my process, Figure 1 is a side view of the rolls employed in the first pass. Fig. 2 is a side view of the rolls employed in the last pass. Fig. 3 is a side view of the rolls employed in forming the swell on the sides of the ax. Fig. 4 is a side view of a set of intermediate rolls. Fig. 4ª is a side view of a set of intermediate rolls. Fig. 5 is a perspective view of a blank bar after being rolled to a T shape and before being subjected to the last pass. Fig. 6 is a sectional perspective view of the blank bar after the last pass. Fig. 7 is a perspective view of an ax-blank severed from the blank bar and welded but not spread or ground. Fig. 8 is a perspective view of a finished ax.

As my invention consists, essentially, in the process or method of manufacturing solid steel axes by rolling, I do not deem it necessary to describe in detail the form of rolls, but will only refer to the same in sufficient terms for a comprehension of the invention.

Figs. 1, 2, 3, 4 illustrate the contour and relative arrangement and relation of the principal rolls. It will be understood that the metal may be subjected to as many and as varied passes as may be found expedient to reduce the ingot to its proper shape and dimensions.

The minor details are left to the judgment and skill of the operator or manufacturer.

When the bar, by successive passes through properly-grooved rolls, has assumed the T shape shown in the drawings, it is passed through a set of rolls (shown in Fig. 3,) consisting, preferably, of the horizontal guiding-roll A and the rolls B B on vertical axes, said rolls B B being formed with recesses or projections on their peripheries, as shown at $b\ b$, so as to produce corresponding swelled portions at $c\ c$ on the sides of the ax-blade. The next and final pass is through a set of rolls adapted to bend upwardly and inwardly the wings E E, which in the successive passes have been diminished at $e\ e$, and formed with fins or squared ridges $ff$ to provide for the helve-eyes and ax-butts. After the blank bar has been bent to the Y shape (shown in Fig. 6) it is severed in suitable ax-lengths on the lines $x\ x$, and each length heated to a welding heat at $f\ f$, the wings brought together and welded on the line $z\ z$, Figs. 7 and 8. The stock or blade is then heated to a cherry redness and spread to give it the proper width and produce a cutting-edge, which latter is ground in the usual way.

The rolling operations which constitute the principal features of my invention leave but little work to be done after the rolls have performed their service. The general contour of the ax being given to the blank before the ax-lengths are severed therefrom, it only remains to weld the head-wings together, thereby completing the helve-eye, and then spread and grind the bit.

It will be seen that I entirely dispense with the usual forging, drop-hammering, clipping, and trimming, and hence I am enabled to produce an ax of solid steel, better in all its qualities than the iron ax having a steel bit, with much less labor and expenditure of time.

By making the entire ax of steel I produce a better quality of bit than where the bit is inserted in a split edge, because I do not subject the steel to the high welding heat required in welding the iron and steel together, such heat being highly injurious to the steel.

As the ax is heated only to a cherry red in spreading the blade previous to grinding, such heating rather improves the quality of the steel instead of injuring or impairing it.

I have described the manufacture of solid steel axes of the single-bit kind; but I do not limit myself to these, as the same process in all its essentials may be employed in producing double-bitted axes, one of the bits being open or split, and its wings afterward welded together.

What I claim as new, and desire to secure by Letters Patent, is—

1. In the manufacture of axes, the method of producing a solid steel ax, which consists in reducing an ingot bar or billet to the form of a blank bar of approximately Y shape in cross-section, by rolling, separating the bar into ax-lengths, and then welding the separated wings or webs together to form the head and eye, substantially as described.

2. In the manufacture of axes of solid steel, the method herein described, which consists in rolling an ingot bar or billet to an approximately Y shape, then severing the blank into ax-lengths, and then welding the separated wings or webs together.

In testimony that I claim the foregoing as my own I have hereto affixed my signature in presence of two witnesses.

VICTOR HALTER.

Witnesses:
FRANK SCHNEIDERLOCHNER,
THOS. A. CONNOLLY.